United States Patent Office 2,815,676
Patented Dec. 10, 1957

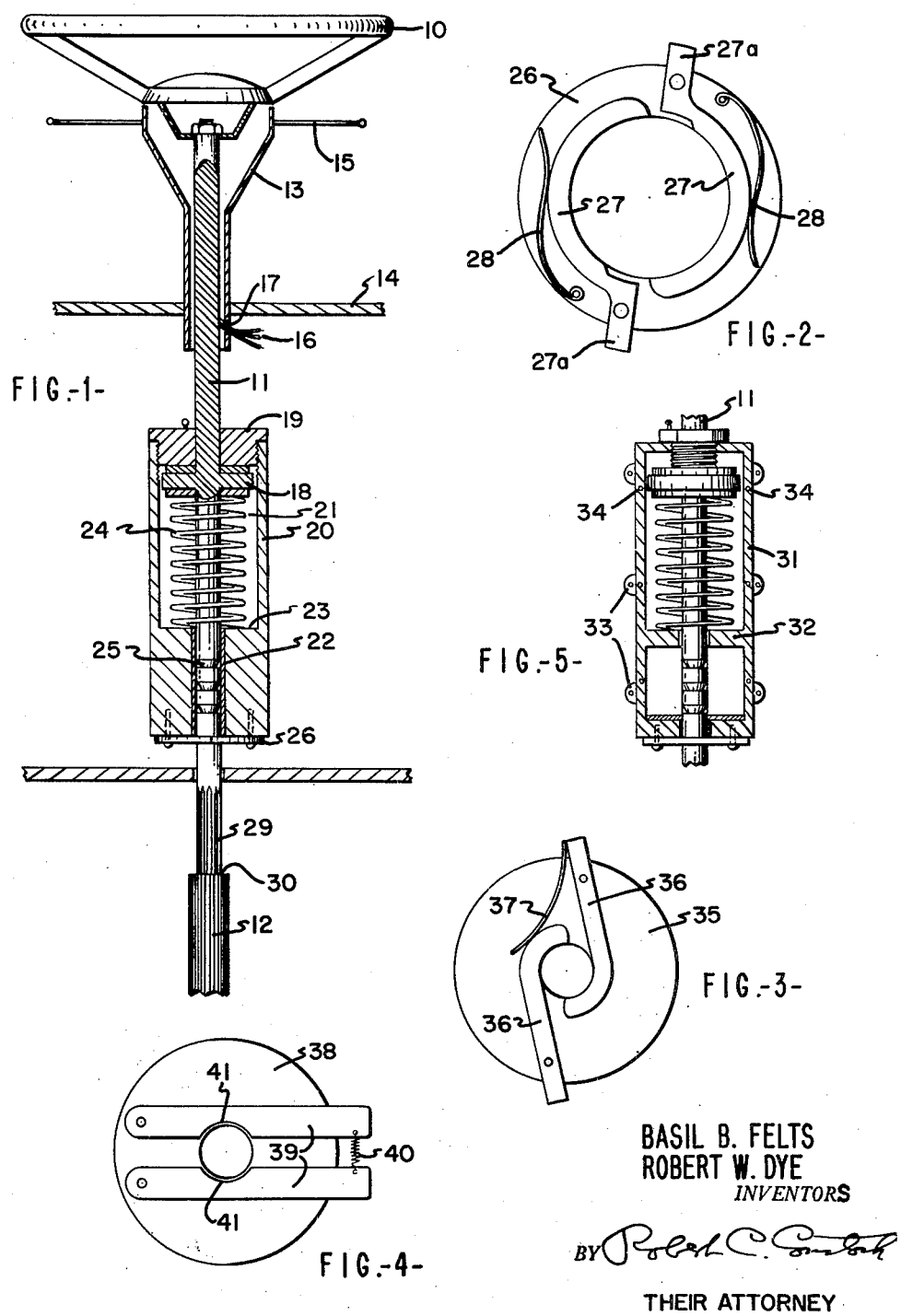

2,815,676

DEPRESSIBLE STEERING ASSEMBLY FOR AUTOMOTIVE VEHICLES

Basil B. Felts and Robert W. Dye, Banning, Calif.

Application December 1, 1955, Serial No. 550,362

8 Claims. (Cl. 74—493)

This invention relates to a depressible steering assembly for automotive vehicles.

It is a well-known fact that large numbers of persons are killed or seriously injured due to impact with the steering wheel and steering assembly of an automotive vehicle upon the occurrence of a collision. It is an object of our invention to provide a depressible steering assembly for automotive vehicles which is adapted to automatically yield beneath the impact of the driver's body in the event of a collision. It is particularly an object of our invention to provide such a structure in which its yieldability does not interfere in any way with the operation and driving control of the steering assembly.

It is another object of our invention to provide a device of the type described which is simple in construction and design, requiring only a limited number of easily manufactured and assembled parts, so that it is capable of widespread use by manufacturers and the general public. It is a related object of our invention to provide such a structure which may be installed as original equipment at the time an automotive vehicle is manufactured or which may be easily, quickly and economically installed on any new automotive vehicle.

It is a further object of our invention to provide such a device in which the steering column passes through the longitudinal axis of a coil spring. The column thus prevents dislocation or binding of the spring and assures its proper operation and orientation at all times.

The steering assembly of our invention preferably includes a housing having an integral interior shoulder for receiving one end of a coil spring, the other end of which bears against a flange which is fixedly attached to the steering column. The steering column extends longitudinally through the axis of the coil spring and housing. The top of the housing, at which the steering column enters, is provided with an adjustable bushing for varying the length of the steering column and/or the spring tension. The lower part of the steering column is notched to receive a pair of spring biased dogs to hold the steering wheel in depressed but operable position in the event of collision. Provision is made for the electrical wires to pass from the steering wheel to the battery and other parts of the vehicle without entanglement at any time.

It is accordingly an object of our invention to provide a device having all of the features and advantages of the construction set forth.

Our invention also comprises such other objects, advantages and capabilities as will later more fully appear and which are inherently possessed by our invention.

While we have shown in the accompanying drawings a preferred embodiment of our invention, it should be understood that the same is susceptible of modification and change without departing from the spirit of our invention.

Referring to the drawings,

Fig. 1 is a sectional view of a preferred embodiment of our invention;

Fig. 2 is a top plan view of the catch ring;

Fig. 3 is an alternative embodiment of the catch ring;

Fig. 4 is another alternative embodiment of the catch ring;

Fig. 5 is an alternative embodiment of the housing.

A preferred embodiment which has been selected to illustrate our invention comprises a steering wheel 10, which is preferably formed of conventional substantially rigid materials. Collapsibility of the steering wheel per se is believed to be undesirable, since it necessarily interferes with the function and steering control of the wheel, whereas our device remains completely operable at all times.

A steering column 11 is attached at its upper end to the steering wheel 10 and at its lower end to a receiver 12 by splines or other suitable means, the receiver in turn being connected to the gear box.

Surrounding the upper part of the steering column 11 is a steering column housing 13, which is semi-splined through the dashboard 14 of the vehicle. The steering column housing 13 does not turn with the steering wheel 10. The lower end of the steering column housing 13 is disposed beneath the dashboard 14.

A transmission shifting lever may be provided adjacent the steering wheel 10 or elsewhere, as desired. A turn signal indicator 15 may also be mounted on the steering column housing 13. It will be noted that the electric wires 16 from the horn and/or turn signal indicator 15 pass downwardly through the steering column housing 13, which is provided adjacent the lower end thereof with a small opening 17, through which the wires 16 pass to connect to the battery or other parts of the vehicle.

The steering column 11 is provided with an outwardly directed substantially circular flange 18 adjacent the midportion thereof. The portion of the steering column 11 directly above the flange 18 extends through an adjustable bushing 19 into an elongated cylindrical housing 20. The bushing 19 has exterior screwthreading which fits into a screwthreaded opening in the top of the housing 20.

The housing 20 is preferably formed from a solid metal cylinder which is drilled to provide a hollow portion 21 in the upper part thereof and has an elongated bearing 22 in the lower part thereof, in which the steering column 11 is journaled. The housing 20 is provided with an inwardly directed shoulder 23. A coil spring 24 is mounted within the upper part of the housing 20 surrounding the steering column 11, with its lower end bearing against the top of the shoulder 23 and its upper end bearing against the flange 18. The flange 18 is slidably mounted in the upper part of the housing 20 and is normally held directly beneath the bushing 19 by the pressure of the coil spring 24.

The bushing 19 is preferably provided with a Zerk fitting through which lubrication can pass. The adjacent part of the mechanism, including washers, is provided with suitable grooves and openings so that the entire assembly can be easily and properly lubricated.

The portion of the steering column 11 which is directly above the bottom of the housing 20 is provided with a plurality of spaced annular notches 25. Attached to the bottom of the housing 10 by screws or other suitable attaching means is a catch ring 26, which carries a pair of pivotally mounted dogs 27. The dogs 27 are substantially semi-circular and are pivotally attached at one end thereof to the ring 26. A flat spring 28 is disposed between each of the dogs 27 and the side of the ring 26 to bias the dogs 27 toward the center of the ring 26. A portion 27a of each dog 27 projects outwardly beyond the periphery of the ring 26 to permit manual pivoting of the dogs 27 in opposition to the biasing of the springs 28.

The portion of the steering column 11 beneath the housing 20 is provided with splines 29 which slidably fit into a complementary spline receiving portion 30 of the receiver 12. Other suitable slidable connecting means may also be provided.

In operation, the steering assembly functions in the conventional manner until a collision occurs. In such event, the impact from the driver's body and the collision cause the steering wheel 10 to move away from the driver. This movement is permitted by downward movement of the steering column 11 against the pressure of the coil spring 24, with the splines 29 moving along the spline receiving portions 30 of the receiver 12. The coil spring 24 thus absorbs the impact in a resilient manner.

As the steering column 11 moves downwardly, one or more of the notches 25 may become aligned with the dogs 27. In such case, the springs 28 cause the dogs 27 to move into the notches 25 to hold the steering wheel in depressed position. This prevents any backlash which might result from a release of pressure on the coil spring 24. It should be noted, however, that the operation of the steering assembly is not adversely affected while it is held in depressed position. Release of the steering column 11 can be achieved by manual release of the dogs 27 by means of their projections 27a.

With regard to the functioning of the coil spring 24, it will be noted that the steering column 11 extends through the longitudinal axis of the coil spring 24. The coil spring 24 is thus prevented from buckling or binding and is always held in proper position.

The size, length and strength of the coil spring 24 can be varied as desired. In this connection, the adjustable bushing 19 can be adjusted as desired either for the purpose of lengthening or shortening the steering wheel 10 or to change the spring pressure.

It will be noted that as the steering wheel 10 and steering column 11 move downwardly, the steering column housing 13 moves with them. The lower end of the steering column housing 13 is adapted to engage the top of the bushing 19 in order to prevent the electrical wires 16 from becoming entangled with the housing 20 or other parts of the automobile.

Referring to Fig. 3 of the drawings, this figure shows an alternative embodiment of our catch ring in which a ring 35 is provided with a pair of pivotally mounted dogs 36 which are biased toward the center of the ring by a single spring 37.

Referring to Fig. 4 of the drawings, this shows another embodiment of our catch ring in which a ring 38 is provided with a pair of dogs 39 biased toward each other by a single coil spring 40. The dogs 39 are provided with complementary cutout portions 41.

Referring to Fig. 5 of the drawings, this shows an alternative embodiment of our housing in which a housing 31 is formed from two halves. The housing has an inwardly directed integral shoulder 32 which supports the lower portion of the coil spring. The halves of the housing are provided with a plurality of spaced flanges 33 having openings through which bolts or other fastening members extend. The halves are also provided with spaced steady pins 34 and complementary openings for receiving them, which act to assure perfect alignment of the halves forming the housing 31.

We claim:

1. A depressible steering assembly for automotive vehicles comprising a substantially rigid steering wheel mounted on the upper end of an elongated steering column, the lower end of said steering column carrying a plurality of splines, said splines being slidably and operatively connected to the spline receiving portions of a receiver, a steering column housing surrounding the portion of said steering column between the dashboard of the vehicle and the steering wheel, a substantially cylindrical housing having a hollow portion in the upper part thereof, said housing having in the lower part thereof an elongated bearing, said steering column extending through said hollow portion and being rotatably and slidably journaled in said bearing, said housing having at the juncture of said hollow portion and bearing an integral shoulder, an elongated coil surrounding the portion of said steering column within the hollow portion of said housing, said coil spring having its lower end bearing against said shoulder, a bushing screwthreadedly mounted in the top of said housing, said steering column rotatably and slidably extending through said bushing, said steering column having a flange longitudinally slidably disposed within the upper part of the hollow portion of said housing, the upper end of said coil spring bearing against the lower part of said flange, said steering column having a plurality of annular notches disposed adjacent and above the lower end of said housing, a catch member comprising a ring attached to the bottom of said housing surrounding the lower part of said steering column, said ring having a pair of arcuate dogs, said dogs being spring biased toward said steering column, said steering column adapted upon downward force being exerted thereon to move downwardly against the pressure of said coil spring, said dogs being adapted to engage one of the notches in said steering column to hold said steering column in depressed but operable position.

2. The structure set forth in claim 1, said steering column housing extending beneath the dashboard of the vehicle, electrical wires disposed within said steering column housing and extending from adjacent said steering wheel, said steering column housing having an opening therein beneath the dashboard, said wires extending through said opening, said steering column housing having a lower end disposed beneath said opening and adapted to engage the top of said cylindrical housing upon downward movement of said steering column housing to prevent entanglement of said wires with said cylindrical housing.

3. The structure set forth in claim 2, each of said dogs being pivotally mounted on said catch ring, each of said dogs having a portion projecting outwardly from said catch ring, said outwardly projecting portions adapted to be manually grasped to pivot said dogs against the pressure of said spring biasing and release said dogs from said notches.

4. A depressible steering assembly for automotive vehicles comprising a substantially rigid steering wheel mounted on the upper end of an elongated steering column, a substantially cylindrical housing having a hollow portion in the upper part thereof, said housing having in the lower part thereof an elongated bearing, said steering column extending through said hollow portion and being rotatably and slidably journaled in said bearing, said housing having at the juncture of said hollow portion and bearing an integral shoulder, an elongated coil spring surrounding the portion of said steering column within the hollow portion of said housing, said coil spring having its lower end bearing against said shoulder, a bushing screwthreadedly mounted in the top of said housing, said steering column rotatably and slidably extending through said bushing, said steering coluumn having a flange longitudinally slidably disposed within the upper part of the hollow portion of said housing, the upper end of said coil spring bearing against the lower part of said flange, said steering column having a plurality of annular notches disposed adjacent and above the lower end of said housing, a catch member comprising a ring attached to the bottom of said housing surrounding the lower part of said steering column, said ring having a pair of arcuate dogs, said dogs being spring biased toward said steering column, said steering column adapted upon downward force being exerted thereon to move downwardly against the pressure of said coil spring, said dogs being adapted to engage one of the notches in said steering column to hold said steering column in depressed but operable position.

5. A depressible steering assembly for automotive vehicles comprising a substantially rigid steering wheel mounted on the upper end of an elongated steering column, a substantially cylindrical housing having a hollow portion in the upper part thereof, said housing having in the lower part thereof a bearing, said steering column extending through said hollow portion and being rotatably and slidably journaled in said bearing, said housing having a shoulder, an elongated coil spring surrounding the portion of said steering column within the hollow portion of said housing, said coil spring having its lower end bearing against said shoulder, a bushing screwthreadedly mounted in the top of said housing, said steering column rotatably and slidably extending through said bushing, said steering column having a flange longitudinally slidably disposed within the upper part of the hollow portion of said housing, the upper end of said coil spring bearing against the lower part of said flange.

6. A depressible steering assembly for automotive vehicles comprising a substantially rigid steering wheel mounted on the upper end of an elongated steering column, a substantially cylindrical housing having a hollow portion, said steering column rotatably and slidably extending through said housing, said housing having a shoulder, an elongated coil spring surrounding said steering column within the hollow portion of said housing, said coil spring having its lower end bearing against said shoulder, a bushing screwthreadedly mounted in the top of said housing, said steering column rotatably and slidably extending through said bushing, said steering column having a flange longitudinally slidably disposed within the upper part of the hollow portion of said housing, the upper end of said coil spring bearing against the lower part of said flange, said steering column having a plurality of annular notches disposed adjacent and above the lower end of said housing, a catch member comprising a ring attached to the bottom of said housing surrounding the lower part of said steering column, said ring having a pair of arcuate dogs, said dogs being spring biased toward said steering column, said steering column adapted upon downward force being exerted thereon to move downwardly against the pressure of said coil spring, said dogs being adapted to engage one of the notches in said steering column to hold said steering column in depressed but operable position.

7. The structure set forth in claim 6, said bushing being longitudinally adjustable with respect to said housing to permit longitudinal adjustment of said steering column and coil spring.

8. A depressible steering assembly for automotive vehicles comprising a steering wheel rotatably mounted on the upper end of an elongated steering column, a substantially cylindrical housing having a hollow portion, said steering column rotatably and slidably extending through said housing, an elongated coil spring surrounding said steering column within the hollow portion of said housing, said steering column having a flange longitudinally slidably disposed within the upper part of a hollow portion of said housing, the upper end of said coil spring bearing against the lower part of said flange, said steering column having a plurality of annular notches disposed adjacent and above the lower end of said housing, a catch member comprising a ring attached to the bottom of said housing surrounding the lower part of said steering column, said ring having a pair of arcuate dogs, said dogs being spring biased toward said steering column, said steering column adapted upon downward force being exerted thereon to move downwardly against the pressure of said coil spring, said dogs being adapted to engage one of the notches in said steering column to hold said steering column in depressed but operable position, each of said dogs having a portion projecting outwardly from said catch ring, said outwardly projecting portions adapted to be manually grasped to pivot said dogs against the pressure of said spring biasing and release said dogs from said notches.

References Cited in the file of this patent

UNITED STATES PATENTS

| | | |
|---|---|---|
| 2,028,953 | Roark | Jan. 28, 1936 |
| 2,140,319 | Heppner | Dec. 13, 1938 |
| 2,214,163 | De Frees | Sept. 10, 1940 |
| 2,227,821 | Burrell | Jan. 7, 1941 |
| 2,648,993 | Kemp | Aug. 18, 1953 |

FOREIGN PATENTS

| | | |
|---|---|---|
| 378,932 | Italy | Feb. 27, 1940 |